(12) United States Patent
Clark et al.

(10) Patent No.: US 7,200,931 B2
(45) Date of Patent: Apr. 10, 2007

(54) CABLE MANAGEMENT BAR AND PATCH PANEL

(75) Inventors: Gordon P. Clark, Eden Prairie, MN (US); Loren J. Mattson, Richfield, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/426,614

(22) Filed: Jun. 27, 2006

(65) Prior Publication Data

US 2006/0225912 A1 Oct. 12, 2006

Related U.S. Application Data

(62) Division of application No. 11/097,648, filed on Apr. 1, 2005, now Pat. No. 7,091,418.

(51) Int. Cl.
*H01B 7/00* (2006.01)
(52) U.S. Cl. .................. 29/868; 29/749; 174/72 A; 174/69
(58) Field of Classification Search .......... 174/69, 174/72 A, 135; 29/868, 749
See application file for complete search history.

(56) References Cited

U.S. PATENT DOCUMENTS

| | | |
|---|---|---|
| 3,611,264 A | 10/1971 | Ellis, Jr. |
| 5,299,956 A | 4/1994 | Brownell et al. |
| 5,639,261 A | 6/1997 | Rutkowski et al. |
| 5,668,910 A | 9/1997 | Arnett |
| 5,674,093 A | 10/1997 | Vaden |
| 5,778,130 A | 7/1998 | Walters et al. |
| 5,836,786 A | 11/1998 | Pepe |
| 5,975,962 A | 11/1999 | Laukonis |
| 6,003,273 A | 12/1999 | Elsholz et al. |
| 6,347,715 B1 | 2/2002 | Drozdenko et al. |
| 6,537,106 B1 | 3/2003 | Follingstad |
| 6,600,106 B2 | 7/2003 | Standish et al. |
| 6,708,830 B2 | 3/2004 | Mendoza |
| 6,818,834 B1 | 11/2004 | Lin |
| 6,996,904 B1 * | 2/2006 | Howell .................... 29/868 |
| 2005/0041947 A1 | 2/2005 | Barker et al. |

FOREIGN PATENT DOCUMENTS

EP 1 021 050 A1 7/2000

OTHER PUBLICATIONS

ADC, engineering drawing, one page (revisions dated Aug. 13, 1999 and Feb. 15, 2001).

(Continued)

*Primary Examiner*—Jinhee J. Lee
(74) *Attorney, Agent, or Firm*—Merchant & Gould P.C.

(57) ABSTRACT

A cable management member for a telecommunications patch panel can include a horizontal cable bar including a first bar end and a second bar end, and a first side member with first and second ends. The first side member can be coupled to the first bar end, the second leg being coupled to the second bar end, and each of the first and second side members can include first and second protrusions extending toward an opposite one of the first or second side members, the first and second protrusions including a space therebetween. A patch panel can include a frame member and the cable management member.

1 Claim, 12 Drawing Sheets

OTHER PUBLICATIONS

ADC Publication, 2 pages, document M169 03/00 Revision © 1999, 2000 ADC Telecommunications, Inc.

Anixter, "1996 Structured Cabling Solutions Catalog", front cover, p. 1-23 and back cover (1996).

AT&T Bell Labs, "Patchmax™ Distribution Hardware Installation Instructions", six pages (1996).

Hubbell, Ltd., "Solutions By Design, Hubbell Premise Wiring Full Line Catalog 2200", front cover, p. 60 and back cover (no date).

Lucent Technologies, "Systimax® Structured Connectivity Solutions Product Guide", front cover, pp. 3-27, 3-34, 3-35, 3-36 and back cover (1998).

The Siemon Company, "The Siemon Company Catalog 1999", front cover, pp. 4.3, 4.5, 5.9, 5.11, and back cover (1999).

* cited by examiner

CABLE MANAGEMENT BAR AND PATCH PANEL

RELATED APPLICATION

This is a divisional of U.S. patent application Ser. No. 11/097,648 filed on Apr. 1, 2005, the entirety of which is hereby incorporated by reference.

TECHNICAL FIELD

The present invention relates to a telecommunications connecting panel and, more particularly, to a patch panel including a frame member detachably coupled to a cable management bar.

BACKGROUND

Local area networks and telecommunications connections often use patch panels, especially at the customer's premises, to enable inter- or cross-connection between telecommunications equipment. Patch panels typically comprise a frame member including plurality of connector locations wherein any of a variety of jacks, including, but not limited to, copper and fiber, may be mounted. The jacks allow for fairly rapid connection and disconnection between two jacks in the same patch panel, or between one jack in the patch panel and another jack in a nearby patch panel, with a patch cord. One type of jack and plug arrangement for a patch panel is an RJ45 type connector, described in U.S. Pat. No. 5,639,261. Other patch panels and jacks are shown and described in U.S. Pat. Nos. 5,299,956 and 5,674,093.

There is an increasing need for cable management in order to keep the various cables organized and protected from damage. One area where damage and/or loss of performance may occur with cables is when excessive bending of the cable occurs. A cable management bar provides a support structure whereon the plurality of cables running to the connector locations may be supported to alleviate any excessive bending. One example of a cable management bar is shown and described in U.S. Pat. No. 6,600,106 to Standish et al., the entirety of which is hereby incorporated by reference.

Various concerns arise in the case of cable management bars. One concern is that the bars may be difficult to mount if they mount to the rack or cabinet at mounting locations different from the panel mounting locations and separate hardware pieces are used to mount the bars to the rack or cabinet. In addition, if the bars are permanently affixed to the panels, not every situation requires bars, thereby resulting in unnecessary structure in the rack or cabinet.

There is a need for improved patch panels and cable management bars.

SUMMARY

The present invention relates to a telecommunications connecting panel and, more particularly, to a patch panel including a frame member detachably coupled to a cable management bar.

According to one aspect, a cable management member for a telecommunications patch panel includes a horizontal cable bar including a first bar end and a second bar end, and a first side member and a second side member, the first side member being coupled to the first bar end, the second side member being coupled to the second bar end, and each of the first and second side members including first and second protrusions extending toward an opposite one of the first or second side members, the first and second protrusions defining a space therebetween.

According to another aspect, a telecommunications patch panel includes a frame member including a front face with an opposing rear face, a first frame end defining a first aperture, and a second frame end defining a second aperture, with a plurality of connector locations disposed between the first frame end and the second frame end. The telecommunications patch panel also includes a cable management member including a horizontal cable bar including a first bar end and a second bar end, a first side member being coupled to the first bar end, the second side member being coupled to the second bar end, and each of the first and second side members including first and second protrusions extending toward an opposite one of the first or second side members, the first and second protrusions defining a space therebetween. The first protrusion of the first side member of the cable management member is positioned in the first aperture of the first frame end of the frame member, and the first protrusion of the second side member of the cable management member is positioned in the second aperture of the second frame end of the frame member when the cable management member is coupled to the frame member.

According to yet another aspect, a telecommunications patch panel includes a frame member including a front face with an opposing rear face, a first frame end defining a first aperture, and a second frame end defining a second aperture, with a plurality of connector locations disposed between the first frame end and the second frame end. The telecommunications patch panel also includes a cable management member including a horizontal cable bar including a first bar end and a second bar end, a first side member, and a second side member, the first side member being coupled to the first bar end, the second side member being coupled to the second bar end, and each of the first and second side members including first and second pairs of protrusions extending toward an opposite one of the first or second side members, the first and second pairs of protrusions defining a space therebetween sized to receive a portion of the frame member. The first pair of protrusions of the first side member of the cable management member is positioned in the first aperture of the first frame end of the frame member and the space of the first side member receives a portion of the first frame end, and the first pair of protrusions of the second side member of the cable management member is positioned in the second aperture of the second frame end of the frame member and the space of the second side member receives a portion of the second frame end when the cable management member is coupled to the frame member.

According to another aspect, a method of coupling a cable management member to a frame member of a patch panel includes: providing a cable management member including a horizontal cable bar including a first bar end and a second bar end, a first side member, and a second side member, the first side member being coupled to the first bar end, the second side member being coupled to the second bar end, and each of the first and second side members including a protrusion extending toward an opposite one of the first or second side members; positioning the protrusion of the first side member into a first aperture defined in a first frame end of a frame member; moving the second side member towards the frame member so that a tapered surface of the protrusion of the second side member rides along a portion of a second frame end of the frame member until the protrusion clears the frame member; and allowing the protrusion of the second side member to be received in a second aperture defined in the second frame end of the frame member.

DETAILED DESCRIPTION

The present invention relates to a telecommunications connecting panel and, more particularly, to a patch panel including a frame member detachably coupled to a cable management bar.

Referring now to FIGS. 1–7, an embodiment of a patch panel 100 with a frame member 110 is shown for use in inter-or cross connecting telecommunications equipment. Also shown is a cable management member 150. Patch panel 100 may be mounted to a rack or cabinet of conventional construction (not shown), such as with fasteners passing through openings 118 of the frame member 110.

Figure 15:
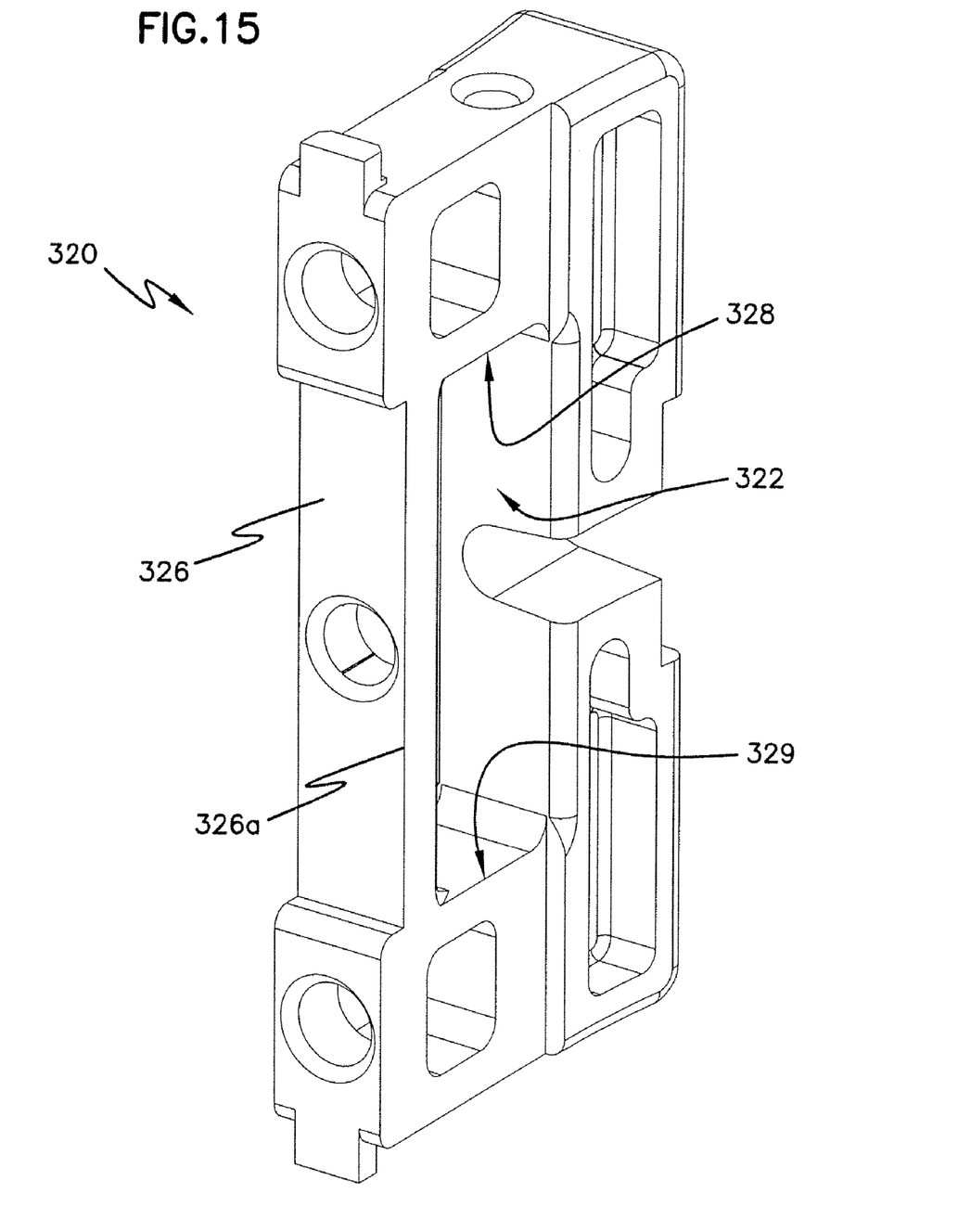
FIG. 15 is a perspective view of one member of the frame member of the patch panel of FIG. 1.
Figure 16:
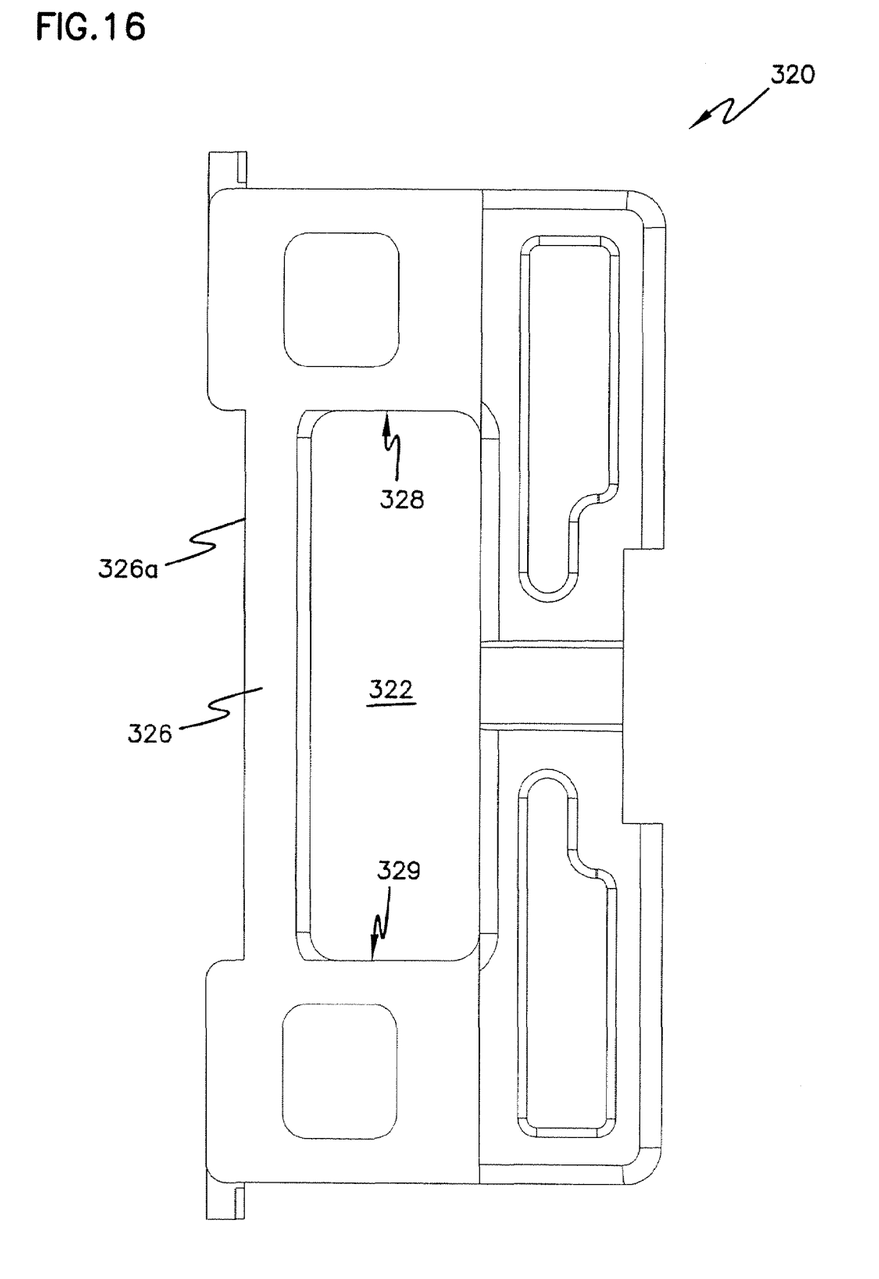
FIG. 16 is a side view of the member of FIG. 15.

The frame member 110 includes parallel bars 106, 108 extending from a first frame end 114 to a second frame end 116. A plurality of members 320 extends between bars 106, 108 to form the offset between bars 106, 108. As shown in FIGS. 15 and 16, each member 320 includes an extension 326, surfaces 328, 329, and an aperture 322 extending through member 320.

Referring back to FIGS. 1–7, bars 106, 108 and members 320 define therebetween a plurality of connector locations 120 running from the first frame end 114 to the second frame end 116, wherein any of a variety of jacks or connector elements, including, but not limited to, copper and fiber, can be mounted. For example, RJ45 jacks, coax connectors, and fiber optic adapters can be mounted in connector locations 120, such as with snaps.

Figure 17:
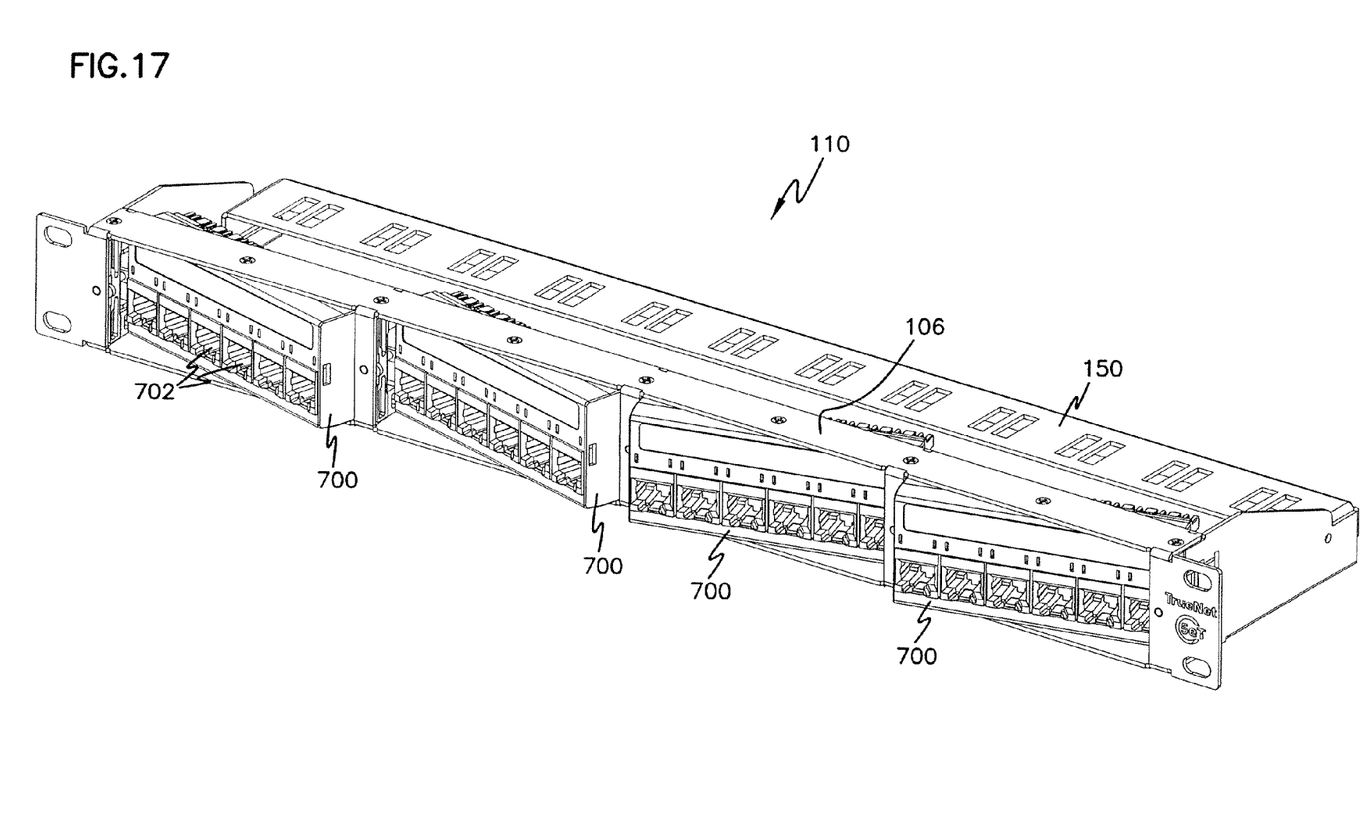
FIG. 17 is a front perspective view of the patch panel of FIG. 1 including a plurality of connector modules.

For example, in one embodiment, a plurality of connector modules 700, each including a plurality of jacks 702, are rotatably mounted in connector locations 120 formed between members 320. See FIG. 17. Members 320 can be used to selectively lock connector modules 700 to frame member 110 as desired. Additional details regarding a frame member configured in a manner similar to that of frame member 110 are disclosed in U.S. Pat. No. 6,537,106 to Follingstad, the entirety of which is hereby incorporated by reference.

The frame member 110 further includes first and second end flanges 224 and 226 with openings 118 positioned at the first and second frame ends 114 and 116. The first and second end flanges 224 and 226 can be used to mount the frame member 110 to a support structure such as a rack or cabinet. Structure and methods other than first and second end flanges may also be used to mount the frame member 110 to a rack or cabinet, such as, for example, the frame member can be integrally attached to a rack during manufacture of the rack itself.

Referring now to FIGS. 8–14, the cable management member 150 is shown in greater detail. Cable management member 150 generally includes a horizontal main bar 380 with first and second ends 382, 384, and side members 482 and 484 coupled to bar 380 at the first and second ends 382, 384.

Figures 8, 9:
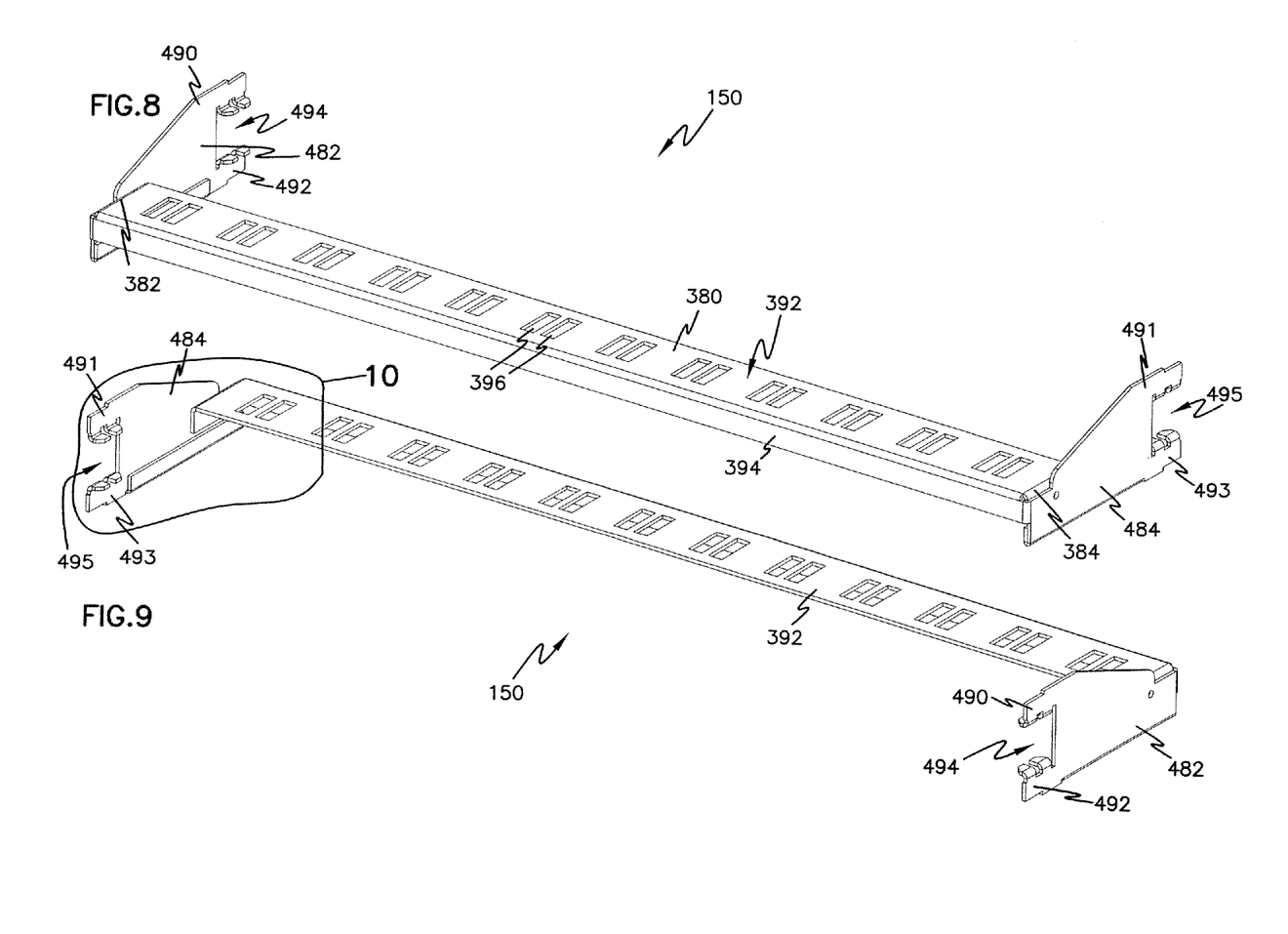
FIG. 8 is a rear perspective view of the cable management bar of the patch panel of FIG. 1.
FIG. 9 is a front perspective view of the cable management bar of FIG. 8.
Figure 10:
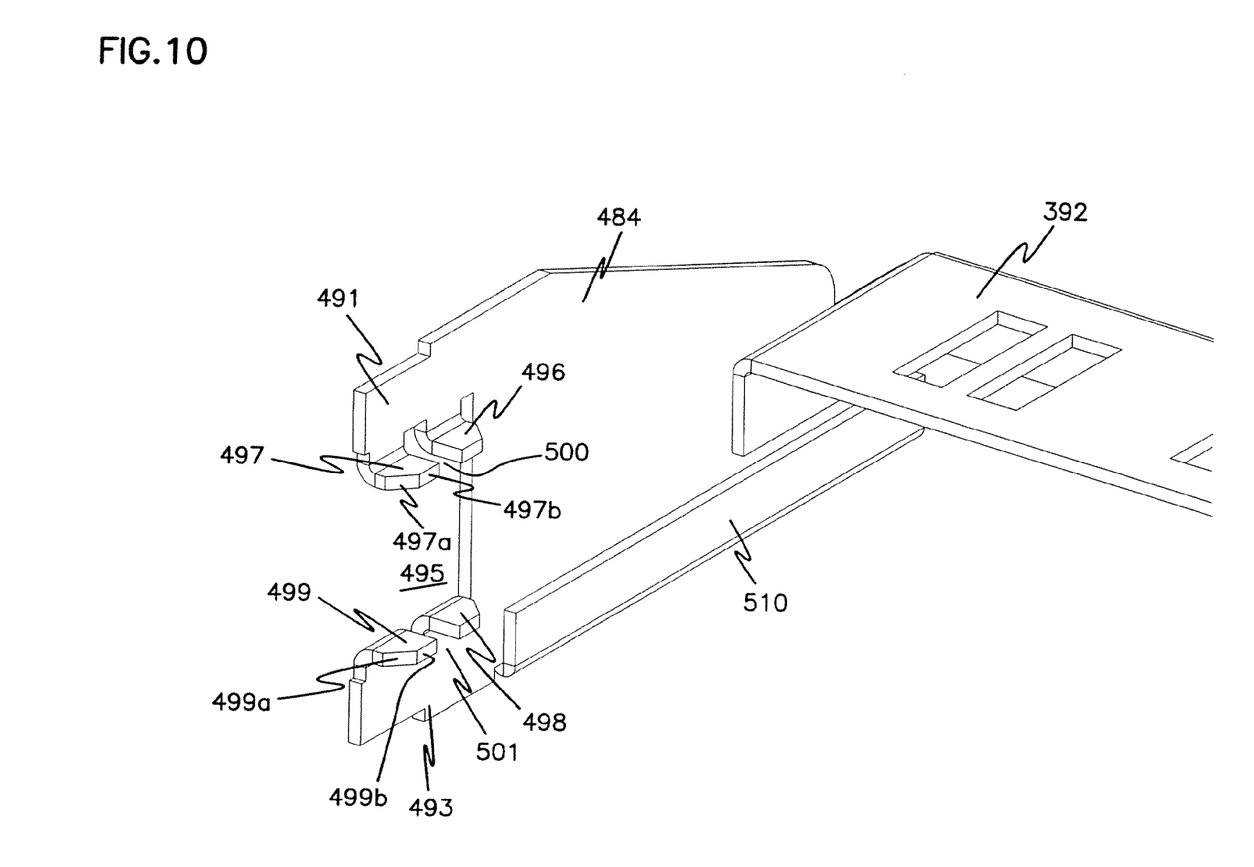
FIG. 10 is an enlarged perspective view of a portion of the cable management bar of FIG. 9.
Figure 11:
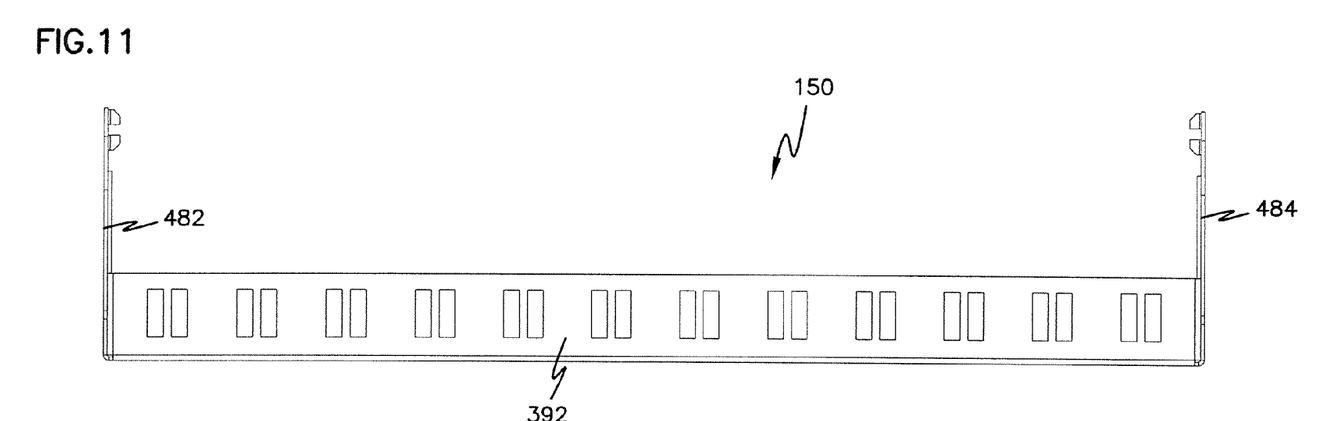
FIG. 11 is a top view of the cable management bar of FIG. 8.
Figure 12:
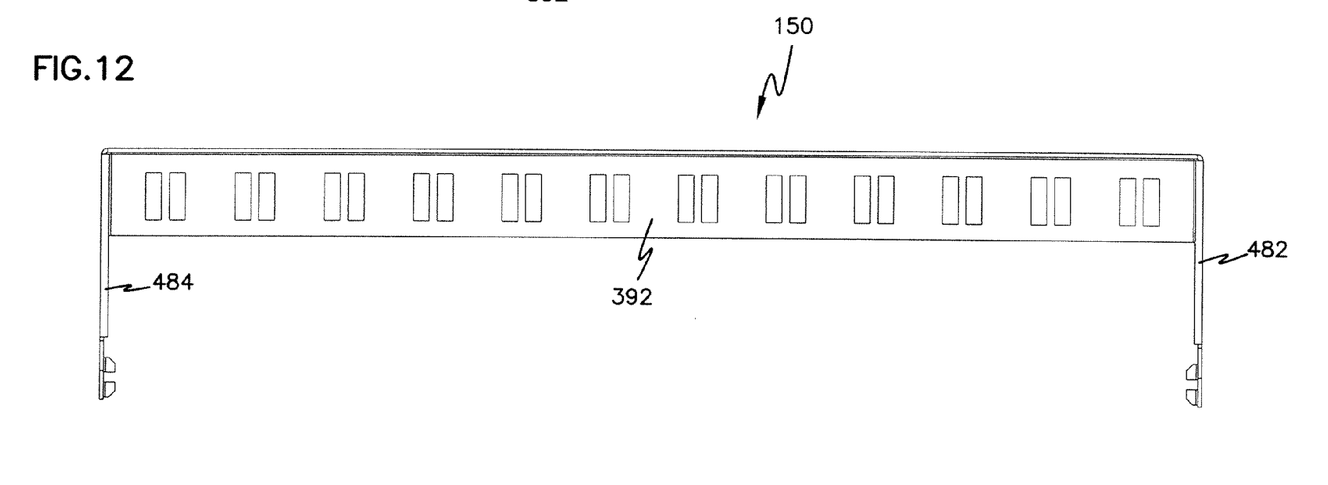
FIG. 12 is a bottom view of the cable management bar of FIG. 8.
Figure 13:
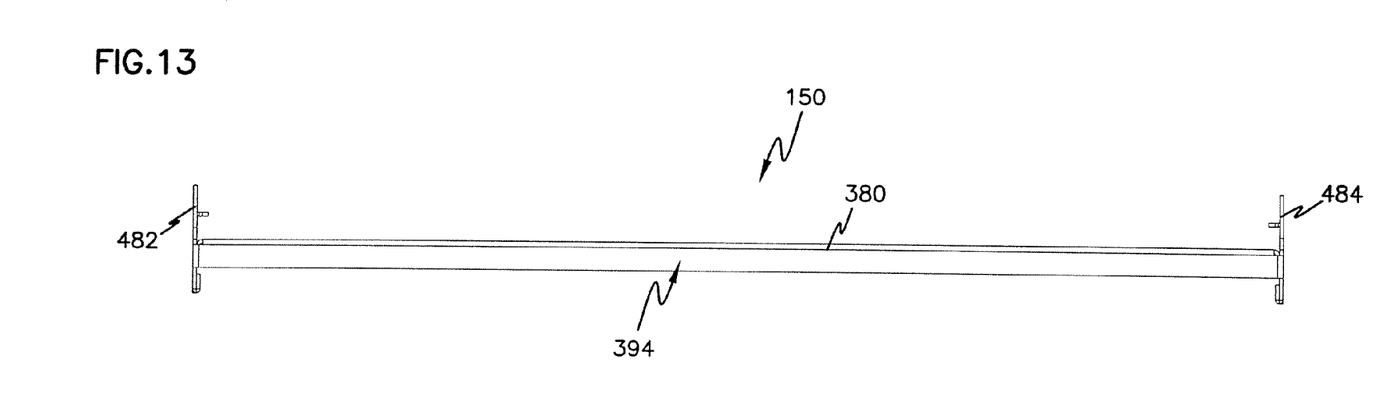
FIG. 13 is a rear elevational view of the cable management bar of FIG. 8.
Figure 14:
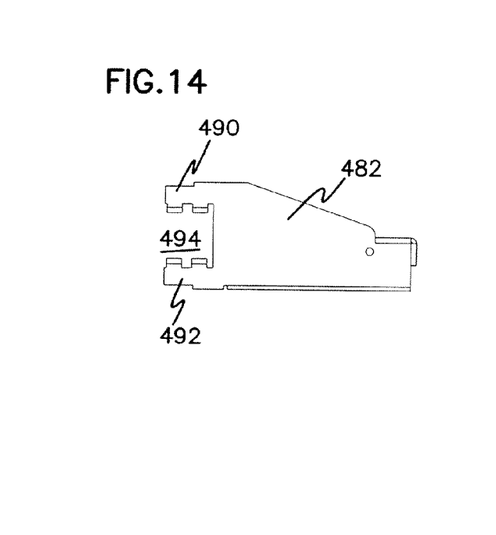
FIG. 14 is a side view of the cable management bar of FIG. 8.

The bar 380 includes a flat surface 392 and a vertical flange 394. In the example shown, the flat surface 392 defines a plurality of slots 396. In example embodiments, cable ties (not shown) can be extended through the slots 396 to secure cables extending along flat surface 392 of bar 380.

Side members 482, 484 include fingers 490, 492 and 491, 493 that generally form C-shaped openings 494, 495. Four protrusions 496, 497, 498, 499 extend inwardly from each of side members 482, 484 towards an opposite one of side members 482, 484. See FIG. 10. Protrusions 496, 497 form space 500, and protrusions 498, 499 form space 501 therebetween. In the example embodiment, protrusions 497, 499 include tapered surfaces 497a, 499a that assist in coupling member 150 to frame member 110, as described below.

In the example shown, ends 486 of side members 482, 484 are coupled to bar 380 by spot welding each side member 482, 484 to a respective end 382, 384 of the bar 380. In this manner, opposite ends 488 of side members 482, 484 can be flexed slightly outwardly with respect to each other to detachably couple the main bar 380 to the frame member 110, as described further below. Other methods for coupling the side members 482, 484 to the bar 380 can also be used or, in alternative embodiments, side members 482, 484 can be formed as part of the main bar 380.

In the examples shown, the frame member 110 and cable management member 150 are both made of sheet metal. For example, the horizontal bar 380 can be made of 16 gauge (0.060") sheet metal, and the side members 482, 484 can be made of rolled metal (see roll 510 in side member 484 shown in FIG. 10) to provide a semi-rigid construction. Other materials can be used.

The members 320 can be formed of a number of materials such as plastic or metal.

Figures 1, 3:
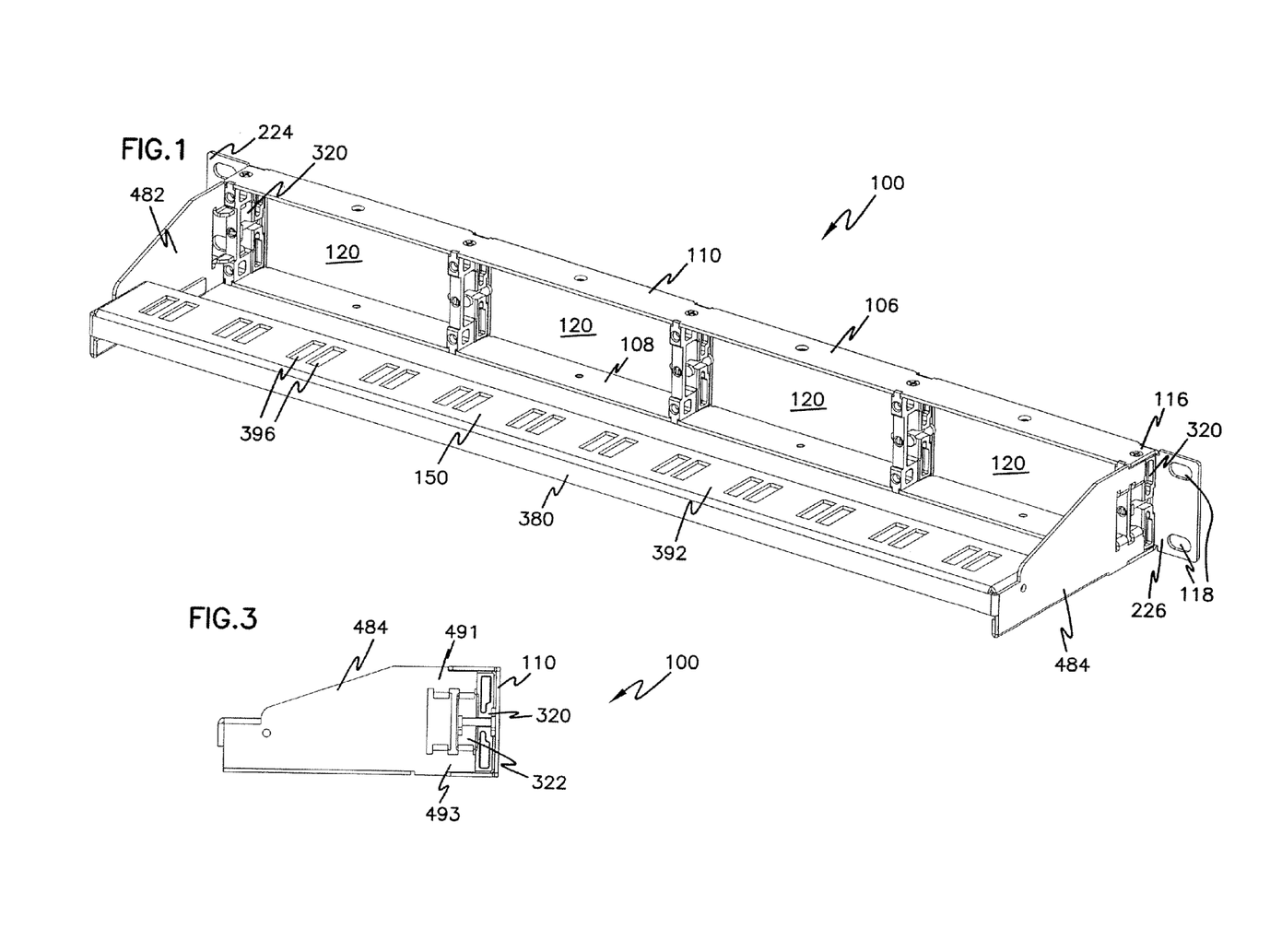
FIG. 1 is a rear perspective view of a patch panel.
FIG. 3 is a side view of the patch panel of FIG. 1.
Figure 2:
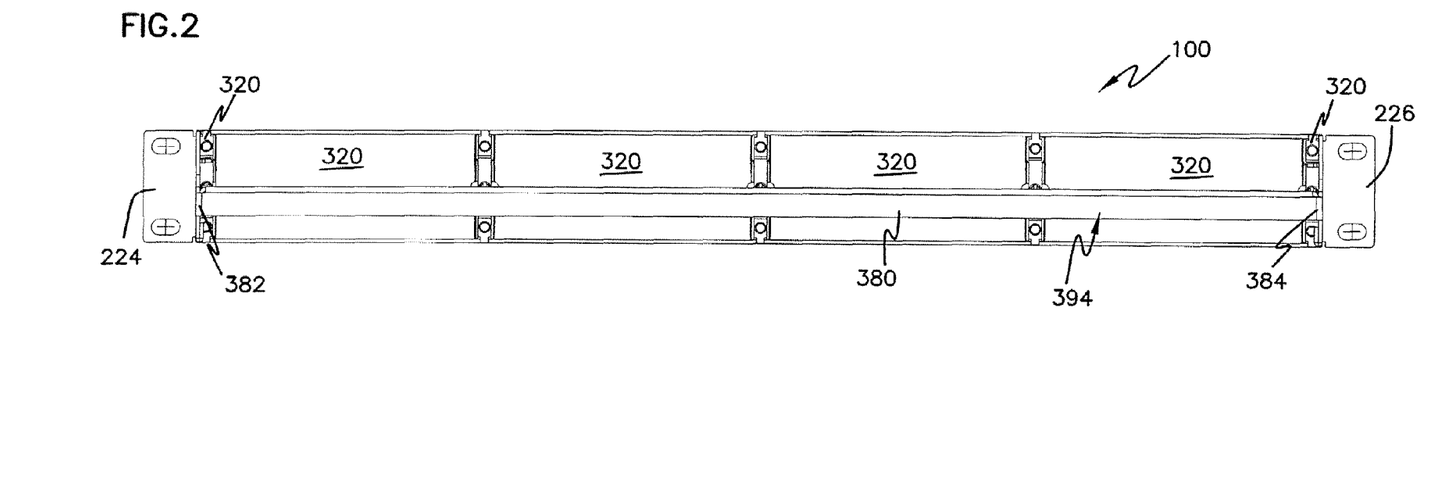
FIG. 2 is a rear elevational view of the patch panel of FIG. 1.
Figure 4:
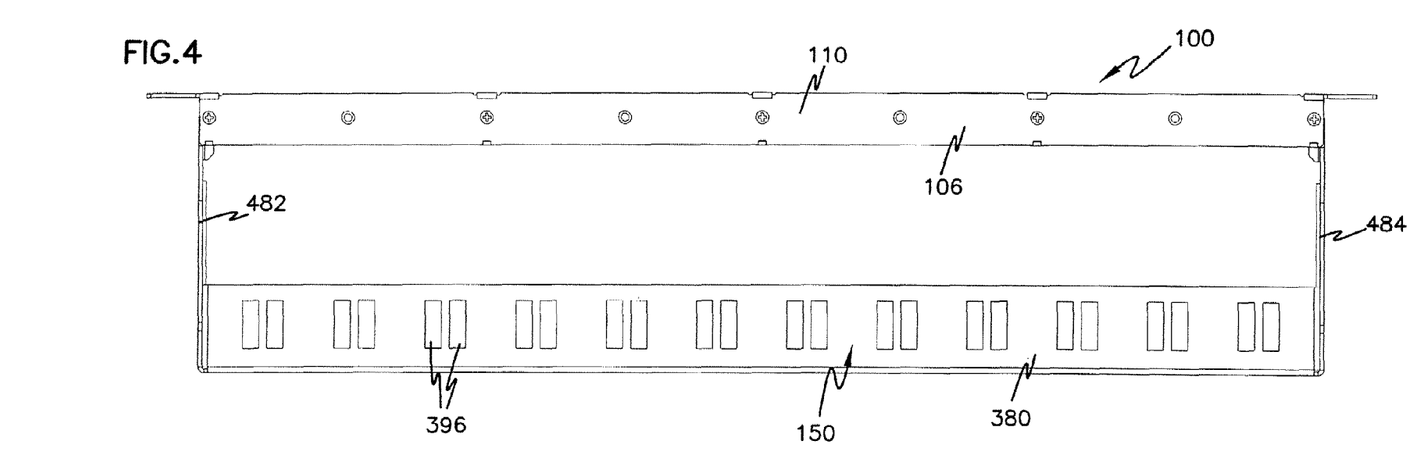
FIG. 4 is a top view of the patch panel of FIG. 1.
Figure 5:
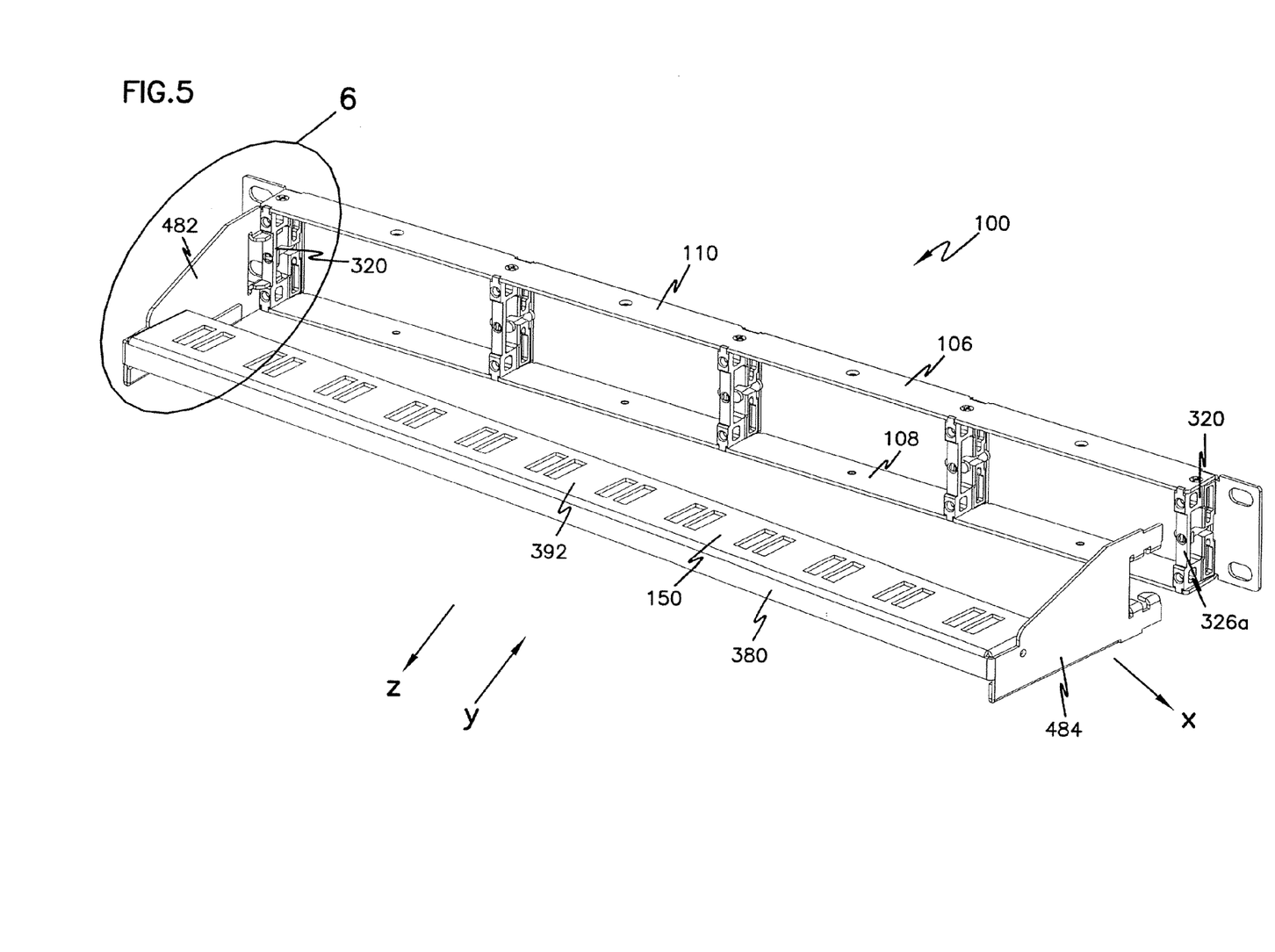
FIG. 5 is a rear perspective view of the patch panel of FIG. 1 with one side member of a cable management bar removed from a frame member.
Figure 6:
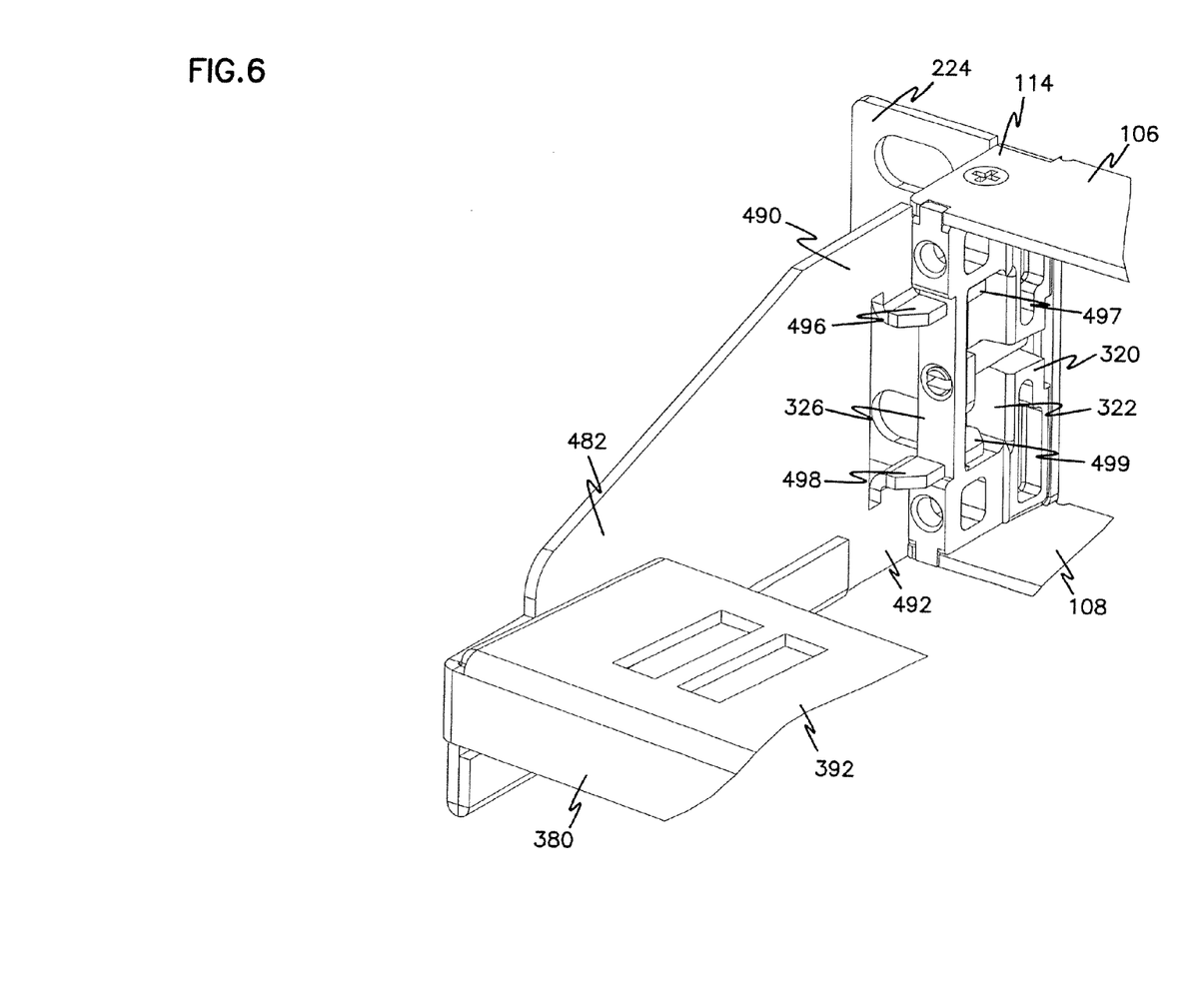
FIG. 6 is an enlarged perspective view of a portion of the patch panel of FIG. 5.
Figure 7:
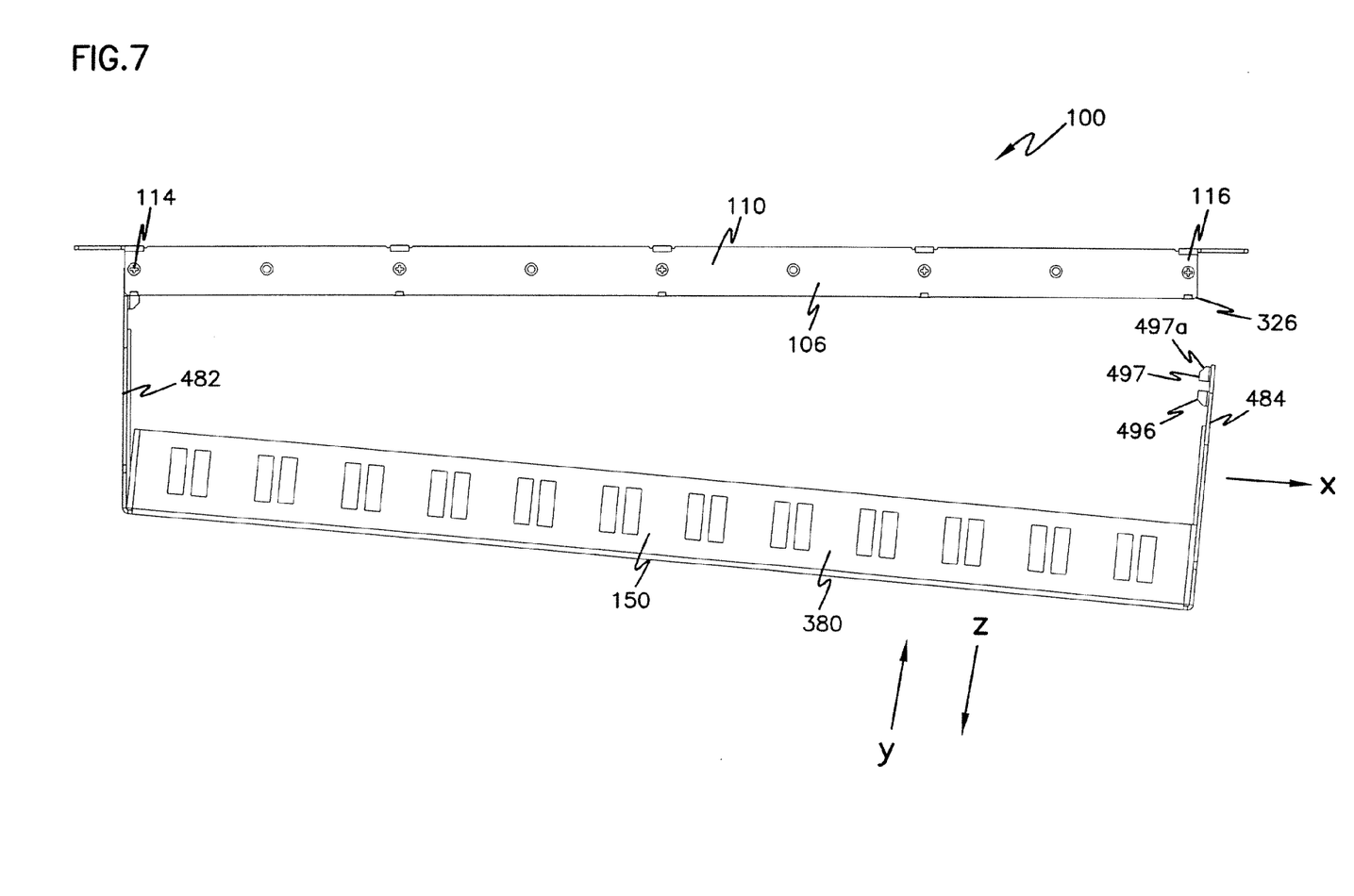
FIG. 7 is a top view of the patch panel of FIG. 5.

Referring now again to FIGS. 1–7, the frame member 110 and cable management member 150 can be detachably coupled as follows. As shown in FIGS. 5–7, protrusions 497, 499 of side member 482 of cable management bar 150 can be positioned in aperture 322 of member 320 located at the first frame end 114 of frame member 110. In this position, spaces 500, 501 receive extension 326 of member 320 (see FIG. 6) so that extension 326 is sandwiched between protrusions 496, 497 and 498, 499 of side member 482. In addition, protrusion 497 engages surface 328 of member 320, and protrusion 499 engages surface 329 of member 320. In this configuration, side member 482 is held in place on frame member 110.

Once side member 482 of cable management bar 150 is coupled to frame member 110 as described above and shown in FIGS. 5–7, side member 484 on second end 384 of bar 150 is swung in a direction Y towards member 320 located at the second frame end 116 of frame member 110. As second end 384 reaches bar 150, tapered surfaces 497a, 499a of protrusions 497, 499 contact edge 326a of extension 326 of member 320 (see FIGS. 5, 15, and 16) located at second frame end 116. Tapered surfaces 497a, 499a ride along edge 326a and cause side member 484 to flex slightly outwardly in a direction X (see FIGS. 5 and 7) until ends 497b, 499b of protrusions 497, 499 clear edge 326a of extension 326 of member 320. Once protrusions 497, 499 of side member 484 clear edge 326a of extension 326, protrusions 497, 499 are received in aperture 322. Extension 326 is also received in spaces 500, 501 of side member 484. In this configuration, both side members 482, 484 are coupled to frame member 110. See FIGS. 1–4.

To decouple the cable management member 150 from the frame member 110, a slight outwardly directed force in direction X can be applied to either side member 482 or 484. For example, a force in direction X shown in FIGS. 5 and 7 can be applied to side member 484 so that protrusions 496, 498 of side member 484 are removed from aperture 322 of member 320. Second end 384 of cable management bar 150 can then be swung away from the second frame end 116 of frame member 110 in a direction Z, and then side member 482 can be removed from the first frame end 114 of frame member 110.

In accordance with the example embodiments described above, the cable management member 150 can be detachably mounted to members 320 of the frame member 110, rather than being mounted to a rack or cabinet. Because the cable management member 150 mounts directly to the frame member 110, there is no need for additional structure on the rack or cabinet for mounting the cable management member 150. Also, no additional hardware or holes are necessary. In addition, a cable management member in accordance with the present invention can be easily removed when not needed and can further be retrofitted to a frame member if needed at a later point.

The above specification, examples and data provide a complete description of the manufacture and of the invention. Since many embodiments of the invention can be made without departing from the spirit and scope of the invention, the invention resides in the claims hereinafter appended.

What is claimed is:

1. A method of coupling a cable management member to a frame member of a patch panel, the method comprising:
   providing a cable management member including a horizontal cable bar including a first bar end and a second bar end, a first side member, and a second side member, the first side member being coupled to the first bar end, the second side member being coupled to the second bar end, and each of the first and second side members including a pair of protrusions extending toward an opposite one of the first or second side members, wherein each of the first and second side members includes a main body, a first finger including the pair of protrusions, and a second finger including a second pair of protrusions, and wherein the main body and the first and second fingers form a C-shape;
   positioning the pair of protrusions of the first side member into a first pair of apertures defined in a first frame end of a frame member;
   moving the second side member towards the frame member so that a tapered surface of the pair of protrusions of the second side member rides along a portion of a second frame end of the frame member until the pair of protrusions clears the frame member; and
   allowing the par of protrusions of the second side member to be received in a second aperture defined in the second frame end of the frame member.

\* \* \* \* \*

UNITED STATES PATENT AND TRADEMARK OFFICE
CERTIFICATE OF CORRECTION

PATENT NO. : 7,200,931 B2  Page 1 of 1
APPLICATION NO. : 11/426614
DATED : April 10, 2007
INVENTOR(S) : Clark et al.

It is certified that error appears in the above-identified patent and that said Letters Patent is hereby corrected as shown below:

Col. 6, line 35, claim 1: "allowing the par of protrusions" should read --allowing the pair of protrusions--

Signed and Sealed this

Twenty-third Day of October, 2007

JON W. DUDAS
*Director of the United States Patent and Trademark Office*